May 3, 1966  F. E. PARSONS  3,248,876
FLUID AND VEHICLE PROPELLING DEVICE
Filed Nov. 7, 1962  10 Sheets-Sheet 1

INVENTOR.
Fred E. Parsons
BY
Harness, Dickey & Pierce
ATTORNEYS.

May 3, 1966  F. E. PARSONS  3,248,876
FLUID AND VEHICLE PROPELLING DEVICE
Filed Nov. 7, 1962  10 Sheets-Sheet 2

INVENTOR.
Fred E. Parsons
BY
Harness, Dickey & Pierce
ATTORNEYS.

May 3, 1966 F. E. PARSONS 3,248,876
FLUID AND VEHICLE PROPELLING DEVICE
Filed Nov. 7, 1962 10 Sheets-Sheet 4

INVENTOR.
Fred E. Parsons
BY
Harness, Dickey & Pierce
ATTORNEYS

May 3, 1966  F. E. PARSONS  3,248,876
FLUID AND VEHICLE PROPELLING DEVICE
Filed Nov. 7, 1962  10 Sheets-Sheet 7

INVENTOR.
Fred E. Parsons
BY
Harness, Dickey & Pierce
ATTORNEYS

May 3, 1966  F. E. PARSONS  3,248,876
FLUID AND VEHICLE PROPELLING DEVICE
Filed Nov. 7, 1962  10 Sheets-Sheet 8

INVENTOR.
Fred E. Parsons
BY
Barnes, Dickey & Pierce
ATTORNEYS

May 3, 1966  F. E. PARSONS  3,248,876
FLUID AND VEHICLE PROPELLING DEVICE
Filed Nov. 7, 1962  10 Sheets-Sheet 9

INVENTOR.
Fred E. Parsons
BY
Harness, Dickey & Pierce
ATTORNEYS

United States Patent Office 3,248,876
Patented May 3, 1966

3,248,876
FLUID AND VEHICLE PROPELLING DEVICE
Fred E. Parsons, Bloomfield Hills, Mich., assignor to F. E. Parsons Corp., Detroit, Mich., a corporation of Delaware
Filed Nov. 7, 1962, Ser. No. 235,946
16 Claims. (Cl. 60—35.54)

This invention relates to fluid and vehicle propelling devices, and particularly to a device for propelling fluid in a system or a vehicle through a fluid.

The device of the present invention embodies forward and rearward converging sections tapering from the abutted ends of greater diameter. The forward or intake section has inner and outer substantially truncated conical portions forming an annular passageway therebetween, so constructed that the cross-sectional area from the intake to the delivery end thereof is substantially constant. The rear section is similarly constructed having inner and outer conical portions, with the cross-sectional area of the annular passageway therebetween substantially constant from the receiving to the exhaust end thereof. The rear section supports a bearing for the shaft which is splined to the inner truncated section within the forward housing section and which will be referred to hereafter as the rotor. When the device is employed for driving a vehicle in water, an intake housing is connected to the front end of the forward housing section, with the inlet opening larger than the rotor frontal area. The intake housing curves downwardly and terminates in a flat plate which is sealed in an opening in the bottom of an amphibious vehicle to provide an intake passage for water which is of substantially greater capacity than that of the forward section.

Radially disposed vanes on the rotor of straight or spiral longitudinal length are enclosed by a shroud forming the tapering conical passageway which produces the circumferential and longitudinal movement of the water due to the rotational and the resultant centrifugal force developed by the increase in radius of the annular passageway. Spiral type vanes are provided on the inner conical portion or stator within the rear housing section which straighten the path of the water which is delivered thereto by the rotor. The longitudinal and rotatable movement of the water by the rotor is straightened by the spiral vanes on the stator so that it will be exhausted from the discharge opening of the device in a substantially longitudinal stream. Due to the fact that the annular truncated conical passageways decrease in area as the radius increases, the cross-sectional area thereof is substantially constant. A solid flow of water will occur from the front intake opening to the rear discharge opening, providing a solid propelling force for the vehicle. It is within the purview of the invention to decrease the cross-sectional area of the annular passageway in the housings at the point of the largest diameter to increase the velocity of the water at the discharge opening to provide greater speed to the vehicle when of light construction or when a reduced load is carried. It is also within the purview of the invention to vary the outlet opening to provide a greater choke thereto when the boat has been lightened to thereby increase the velocity of the discharge water and the speed of the lightened vehicle.

Various means are provided for steering the craft either by changing the direction of a cylindrical end attachment at the outlet opening or by changing the direction of the flow of water therefrom by a vane centrally disposed in the discharge opening. A reverse movement may be provided to the boat by a housing which may be slid down over the discharge opening for the purpose of directing water downwardly and forwardly under the rear end of the boat to produce a reverse movement by the forward discharge of the water. The central vane in the discharge opening directs the water to the right or the left for the purpose of steering the craft or for entirely closing the discharge opening for directing the water laterally into elbows which discharge the water forwardly beneath or at the sides of the boat to thereby reverse the movement of the boat or apply a braking force to its forward movement.

A cap on the end of the stator may be made of rubber having a longitudinally movable rod at the center which forces the cap outwardly into the discharge opening to thereby choke the path and decrease the area to increase the velocity of flow of the discharge water and the speed of the boat. An annular expansible ring on the inner face of the discharge opening will produce the same result. An opening is provided in the forward housing section to which a connection may be attached for providing a suction for removing water from the bilge, or for other purposes. A similar opening may be provided in the rear housing section to which a hose may be attached for producing a flow of water under pressure. A clean-out opening may be provided in the rear housing section for cleaning out any debris which may collect therewithin. Any weeds, stems, roots or other materials which are sucked in through the grill over the opening in the bottom plate of the intake housing will be immediately macerated by the rotor as the water is drawn therein. Anything that passes through the grill openings may be chopped up and passed through the passageways of the rotor and stator.

Valves may be employed in the elbow sections when the discharge vane is employed for closing the discharge opening, and additional valves may be provided on outlet openings to which hoses may be attached for the purpose of having the boat function as a fire boat. In such arrangement, part of the water to the outlet openings may be passed into smaller pipes at each side of the boat which discharges at the forward and rearward ends controlled by valves. By means of adjusting the latter valves, the position of the boat may be maintained when used as a fire boat, moving it to port or starboard, forwardly or rearwardly.

Accordingly, the main objects of the invention are: to provide a fluid propelling device having front and rear sections which converge from the axially disposed joined ends outwardly thereof; to provide a converging rotor and stator section for a propelling device which centrifugally moves a liquid in a constant fluid mass from the intake to the discharge end thereof; to provide a propelling device having a rotor for centrifugally moving a constant volume of liquid through a converging conical passageway which may be restricted at the end to produce an increase in its velocity as it is discharged into a diverging conical passageway to an outlet passageway while maintaining a solid flow of the liquid through the passageways; to vary the volume of the outlet opening of a liquid propelling device to increase or decrease the velocity of flow by the reduced area thereof from the opening; to provide a reversing mechanism for the discharged liquid of a propelling device which produces a reverse movement to a boat or other device propelled thereby; to provide a vane in the outlet opening of a propelling device of a boat or like vehicle by which the discharged water is deflected to the right or left for steering the vehicle; to provide a vane at the discharge opening of a propelling device for a boat or like vehicle which may direct the discharged water forwardly for reversing the movement of the vehicle while providing a pressurized flow of fluid which may be employed for other purposes; to drive a boat with a water propelling device, the flow of which may be cut off so that the water may be employed for other purposes while employing a proportionate quantity thereof for discharge at the forward and rear sides of the boat controlled by valves for moving the boat forwardly and rearwardly and for steering the boat, and, in general, to provide a propelling device for a fluid which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 6 is an enlarged, broken sectional view of the structure illustrated in FIG. 3, with the outside housing broken away;

FIG. 8 is a sectional view of the structure illustrated in FIG. 7, taken on the line 8—8 thereof, with the reversing mechanism illustrated in raised position;

Referring to FIGS. 1 to 9, a propelling device 20 is illustrated, having a frusto-conical forward or intake housing section 21 and a rearward truncated conical discharge housing section 22. Trunnions 23 are provided on each side of the housing section 22 which are mounted on supporting elements 24, the ends of which are secured to lugs 25 attached to the bottom of the boat. An intake housing 26 extends frontwardly and downwardly from the housing section 21 to a plate 27 which is sealed to a bottom opening through the boat. The intake housing has an extending portion 28 which may be cut to the shape of the sloping bottom and is enlarged to permit a large intake of water to be drawn from beneath the boat. The plate 27 is preferably in the form of a grid for preventing the direct passage of plant life or other obstacles to the interior of the housing section 21. The plant life is torn and shredded as it enters the stator where it is minced and forced through the outlet opening of the housing section 22. The intake housing 26 has a gear reduction housing portion 29 in which reduction gears, with or without clutching means, are mounted for reducing the speed of operation of the driving shaft of the rotor.

Figures 1, 2:
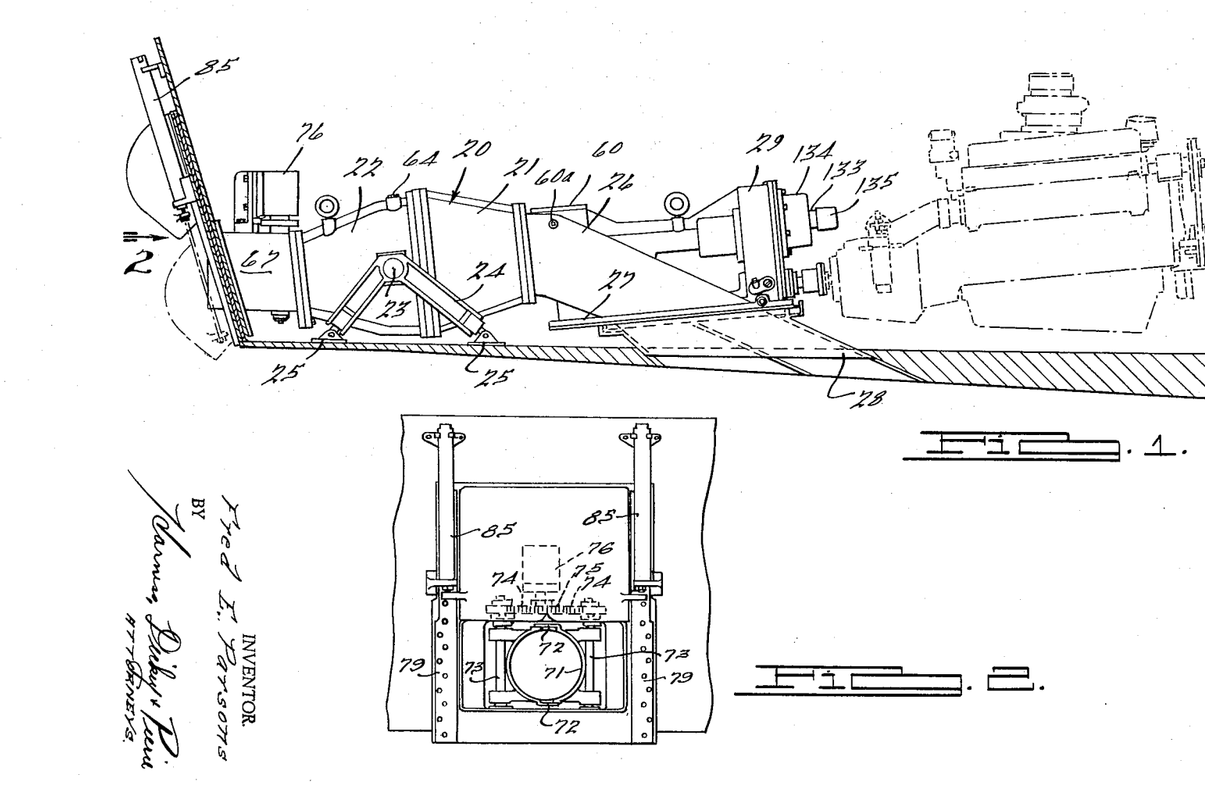
FIGURE 1 is a view in elevation of a propelling device of the present invention mounted in an amphibious vehicle which is to be driven thereby.
FIG. 2 is an end view of the structure illustrated in FIG. 1, taken from the point 2 thereof.
Figure 2:
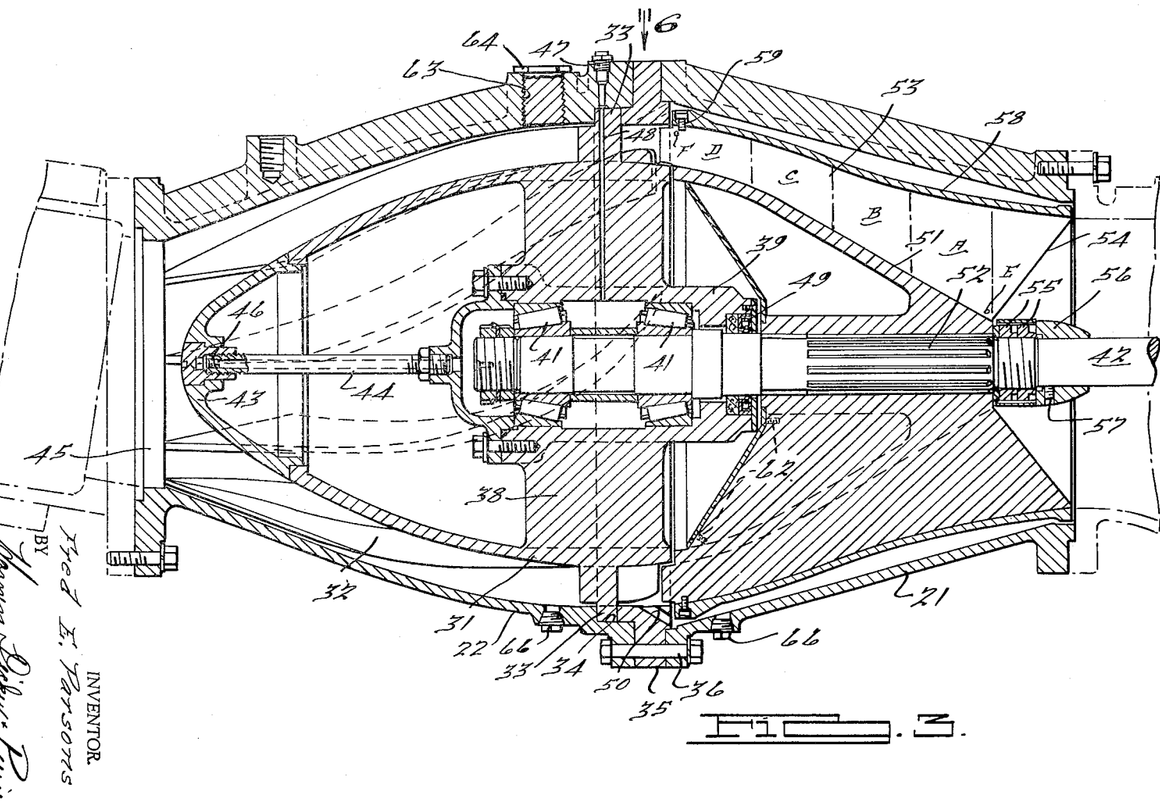
Figure 3:
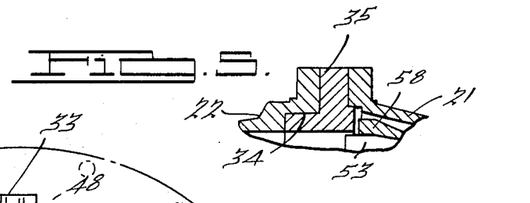
FIG. 3 is a longitudinal sectional view of the propelling device illustrated in FIG. 1.
Figure 4:
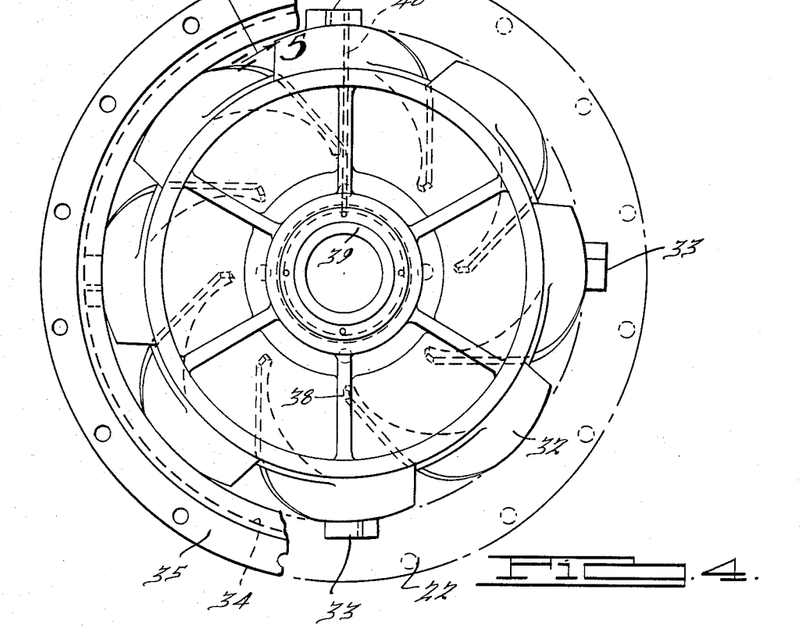
FIG. 4 is a right-hand end view of the rearward housing section and stator illustrated in FIG. 3, with parts broken away.
Figure 5:
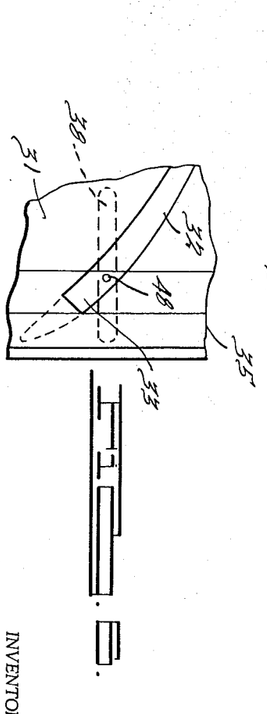
FIG. 5 is an enlarged, broken sectional view of the structure illustrated in FIG. 4, taken on the line 5—5 thereof.

A truncated conical stator 31 has a plurality of radially extending spiral-shaped straightening vanes 32 thereon and a pair of diametrically disposed locating projections or other securing means 33 resting upon an internal shoulder 34 of the stator housing section 22. A flanged ring 35 extends into the shoulder portion and clamps the projections 33 therein when the stator and rotor housing flanges are secured together by a plurality of bolts 36. The internal shape of the housing section 22 and the external form of the stator 31 are such that the converging truncated conical passageway 37 therebetween is substantially of a constant cross-section area from end to end. The entrance area of the passageway of the housing section 22 may, in some instances, be reduced, as will be pointed out hereafter. The stator 31 has a plurality of ribs 38 which support a central boss 39 for bearings 41 of a drive shaft 42 for a rotor 51. An end cap 43 is secured by a rod or pipe 44 to the boss 39 on the discharge end of the stator which may be changed for caps of different sizes to control the area of a discharge orifice 45 of the stator housing section 22. The pipe 44 is closed by a plug 46 and when the cap is removed along with the plug, the grease within the boss 39 may be flushed out when pressure is applied to a grease plug 47 connected to a passageway 48 through one of the ribs 38 which communicates with the interior of the boss 39. A seal 49 is mounted at the forward end of the boss for sealing the shaft 42 against the leakage of a lubricant from within the boss.

The rotor 51 is of conical shape and has a splined aperture which mates with the splines 52 of the shaft 42 in driving relation therewith. The rotor has a plurality of radial vanes 53 of either straight or spiral length extending outwardly therefrom which may be slightly curved at the forward ends 54. A pair of nuts 55 lock the rotor on the shaft and are enclosed by a cap 56 secured to the shaft by a setscrew 57. A shroud 58 extends over the ends of the vanes 53, either cast therewith or fixed thereto by suitable means, herein illustrated as by a plurality of screws 59. The shroud forms an annular uniform passageway with the rotor wall of constant or decreasing cross-sectional area from the intake to the exhaust end. The exhaust end of the rotor passageway may be reduced in cross-sectional area to produce an increase in the velocity of the water through the stator passageway to the discharge end of the device. This increase in velocity occurs without appreciably affecting the intake flow as the resistance tends to be overcome by the solid movement of the fluid in the rotor passageway. As a result, a uniform flow of water or other liquid occurs from the intake to the exhaust end of the rotor and stator passageways.

The inner end of the rotor is closed by a conical-shaped plate 61 which is secured thereto by screws 62. A pressure discharge aperture 63 is provided in the stator housing 22, closed by a removable cap 64. One or more bosses 65, having a threaded recess, are provided on the housings 21 and 22 for receiving an eyebolt by which the device may be moved to or from a boat or other supporting structure.

When the device is employed in an amphibious vehicle, the thrust provided thereby against water or the atmosphere is commensurate to that produced by a propeller in the water. As pointed out above, the shaft is rotated at a reduced speed relative to that of the engine. For a device having an 8-inch intake and a shaft speed of 980 r.p.m.'s per minute, driven by an engine delivering 90 horsepower, a thrust of 1200 pounds is produced. This is approximately 14.8 pounds per horsepower and drives a craft as efficiently as a propeller while eliminating the disadvantages thereof. This efficiency is attributed to the solid stand of water provided through the device from the intake to the outlet end and produces a solid thrust to propel the boat. If the passageways were not so formed as to produce a nonunified flow of the fluid, back pressures would occur and a solid thrust from the exhaust discharge end would not occur efficiently. This would result in a substantial loss of thrust and inefficiency in the operation of the device. The force to the water or other liquid is produced by centrifugal action of the vanes and conical passageway as the rotor is driven. As pointed out hereinabove, the passageway at the midpoint of the device may be choked various percentages for the purpose of increasing the velocity of the water at the discharge end of the device while maintaining a solid volume of water through the device.

To obtain a constant volume flow to the liquid, the passageway about the rotor is progressively reduced from the intake to the discharge end in accordance with the acceleration factor $A=V^2/R$. For the diameter and length of the rotor illustrated as an example, the area of the section A, of the passageway about the rotor as illustrated in FIG. 3, may have a reduction of 5%, area B a reduction of 7½%, the area C a reduction of 10% and the area D of 12½%, providing an over-all reduction of 35%. The reduction may be progressively increased in each section to provide the same or a greater over-all reduction. This reduction in the various areas will change as the diameter and length of the passageway about the rotor changes for different types of propulsion devices for providing greater capacities.

The rotation of the rotor propels the liquid by circumferential and centrifugal force, moving an element of the liquid from the point E to the point F and developing a kinetic energy therein according to the formula $$KE=1/2MV^2/g$$

resulting in a force derived from the formula $$F=MV^2/R$$

This computation is premised on the condition that a solid moving stand of water is passing about the rotor at all times and that the restriction of the passageway provides only a slight back pressure, if any, on the propelled liquid. The area of the passageway over the stator is preferably reduced a small amount from that at the discharge end of the passageway about the rotor to maintain the constant volume to the discharged liquid by a further increase in its velocity.

The spiral movement of the water at the discharge end of the rotor is straightened by the spiral vanes on the stator which are curved to a proper degree to have the water or other liquid delivered from the outlet end of the device in a substantially straight path. The reduced speed of rotation of the rotor substantially reduces wear and renders the device efficient from the very beginning of rotation at extremely low speeds up to the maximum running speed. The device is efficient in all ranges so that when employed in a boat a speed may be obtained from standing to full operation. The movement of the water through the passage 53 produces a suction within the area between the shroud 58 and the inner surface of the rotor housing section 21 from which any collected water or other liquid within the area is drawn off through an aperture 50 through the projection 33. A plug 66 in an aperture through the bottom of the housing sections 21 and 22 permits water to be drained from within the sections to prevent freezing or for other purposes. A plug 60 closes a clean-out or inspection opening in the intake housing 26 and a plug 60a may be provided in an aperture adjacent to the plug 60 to which a hose may be connected in which a suction will be produced.

Figure 7:
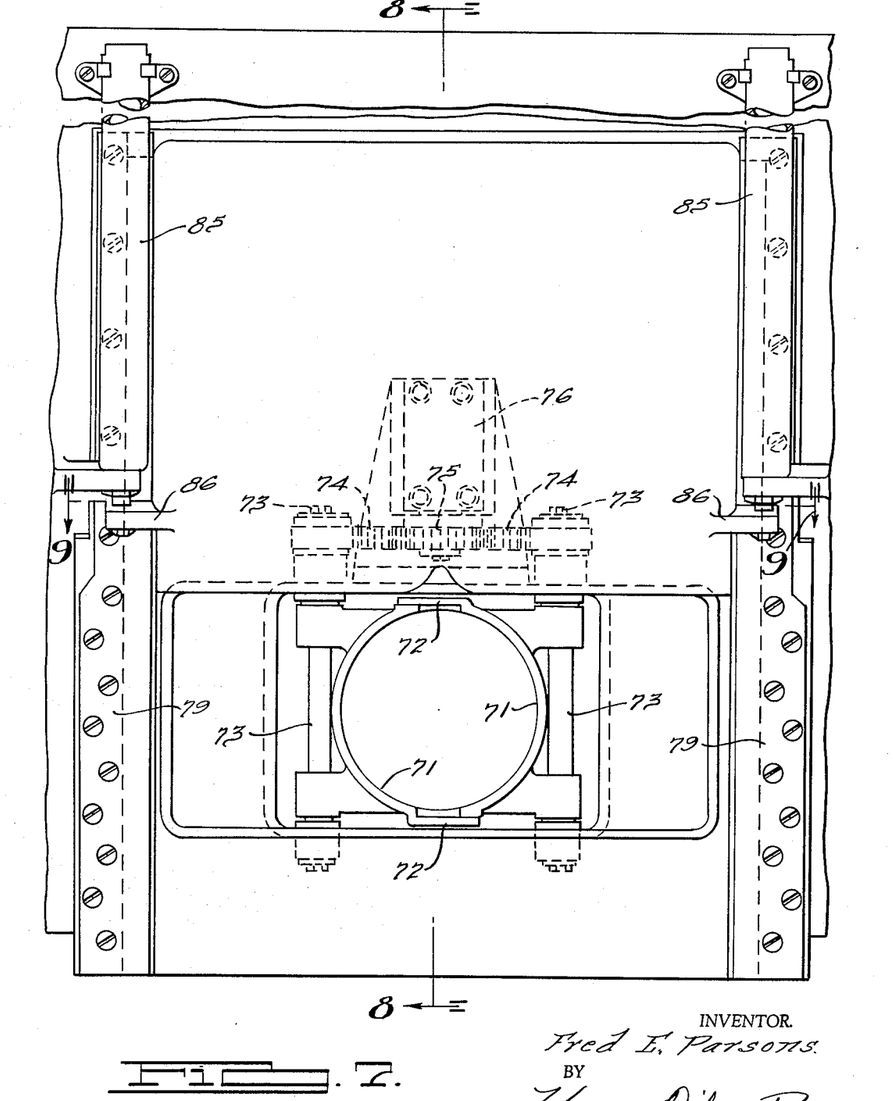
FIG. 7 is an enlarged view of the structure illustrated in FIG. 2.
Figure 9:
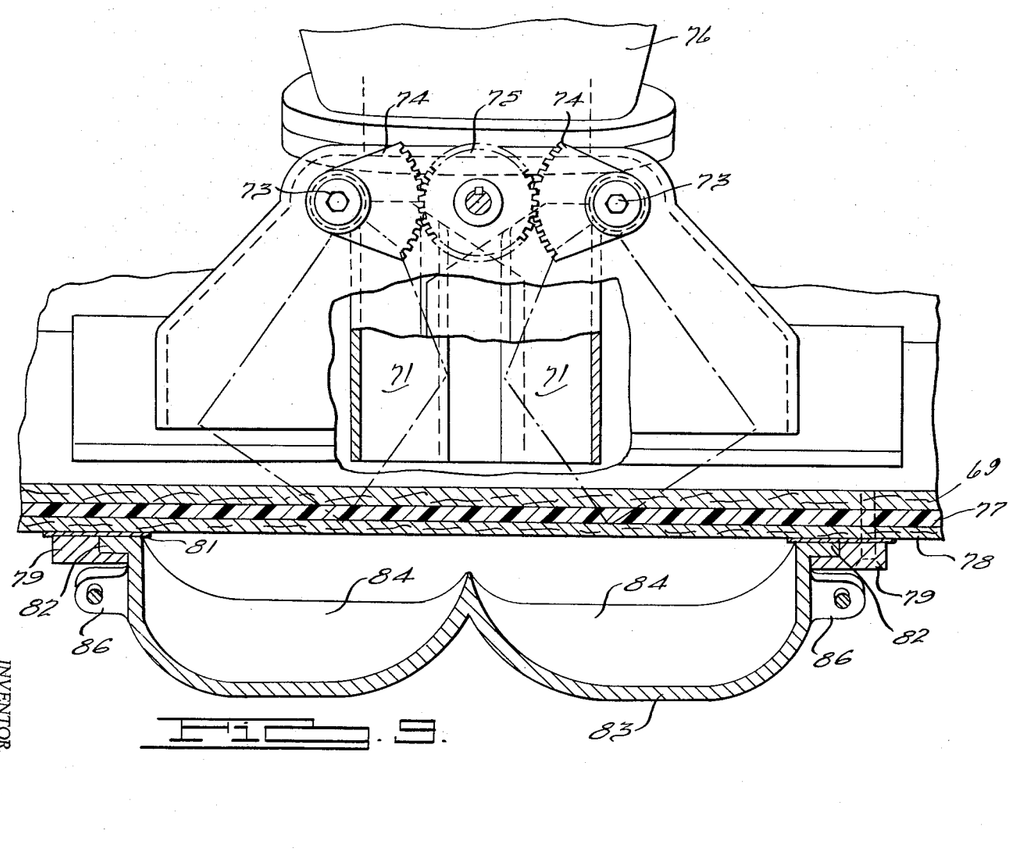
FIG. 9 is a sectional view of the structure illustrated in FIG. 7, taken on the line 9—9 thereof.
Figure 10:
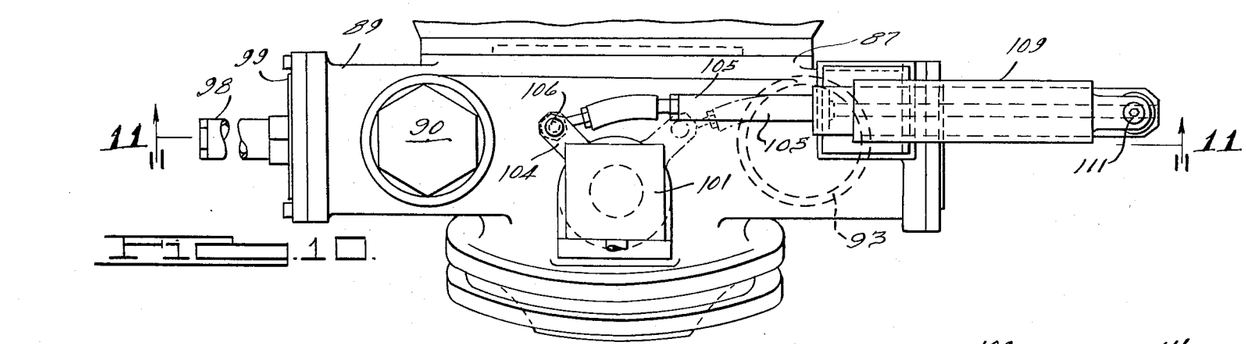
FIG. 10 is a view of structure, similar to that illustrated in FIG. 8, showing a further form of the invention.
Figure 11:
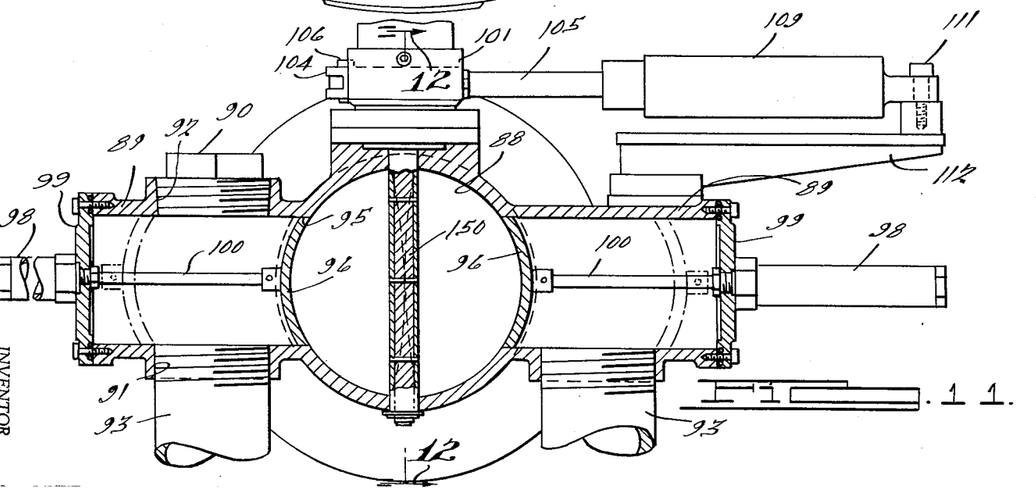
FIG. 11 is a sectional view of the structure illustrated in FIG. 10, taken on the line 11—11 thereof.

As illustrated in FIGS. 7, 8 and 9, the outlet end 45 of the stator housing 22 has a discharge casting 67 secured thereto and provided with a flange 68 which abuts the inner face of a transom 69 of a boat in which the device is mounted. A pair of like oppositely presenting semi-cylindrical castings 71 have an overlapping flange 72 thereon which forms a cylindrical discharge tube when the castings 71 are swung to the right or left on supporting shafts 73. Each of the supporting shafts carries a gear sector 74 having teeth in mesh with the teeth of a pinion gear 75 which rotates the sectors in opposite directions, thereby maintaining the castings 71 in cylindrical relation to each other when swung to the right or the left of the center of the pinion gear 75. This directs the fluid being exhausted from the end 45 of the stator 22 either to the right or to the left of the center line of the device to thereby drive the boat in a turning movement. The pinion gear 75 is connected to a shaft of a fluid motor or other means 76 which is driven in either a clockwise or counterclockwise direction to steer the boat or other vehicle in the water.

Upon the rear face of the transom, a fabricated sheet 77 is sandwiched against the outer face of the transom 69 by a panel 78. The panel has a pair of ways 79 secured thereto on metal strips 81 against which the side flanges 82 of a reversing casting 83 slide when the flanges are supported within the ways 79. The casting 83 has two scooplike portions 84 which, when the casting is moved downward in the ways 79, intercept the flow of water from the discharge castings 71, directing it to the right and left and downwardly and slightly forwardly beneath the transom 69, as illustrated in dot and dash lines in FIG. 8, to thereby arrest the forward movement of the boat and propel it rearwardly. A pair of rods on pistons in cylinders 85 are connected to bosses 86 of the casting 83 and move the casting down to reverse the boat or raise the casting to a position above the discharge of water from the steering castings 71, as illustrated in FIG. 8. The motor 76 positions the steering castings 71 to direct the stream of discharge water to the right or left to steer the boat, and by operating the pistons in the cylinders 85, the casting 86 may be moved downwardly to reversing position for stopping the forward progress of the boat and reversing its movement. By directing the water to one or the other scoop 84, the boat may be guided as it is moved in a reverse direction.

Figure 12:
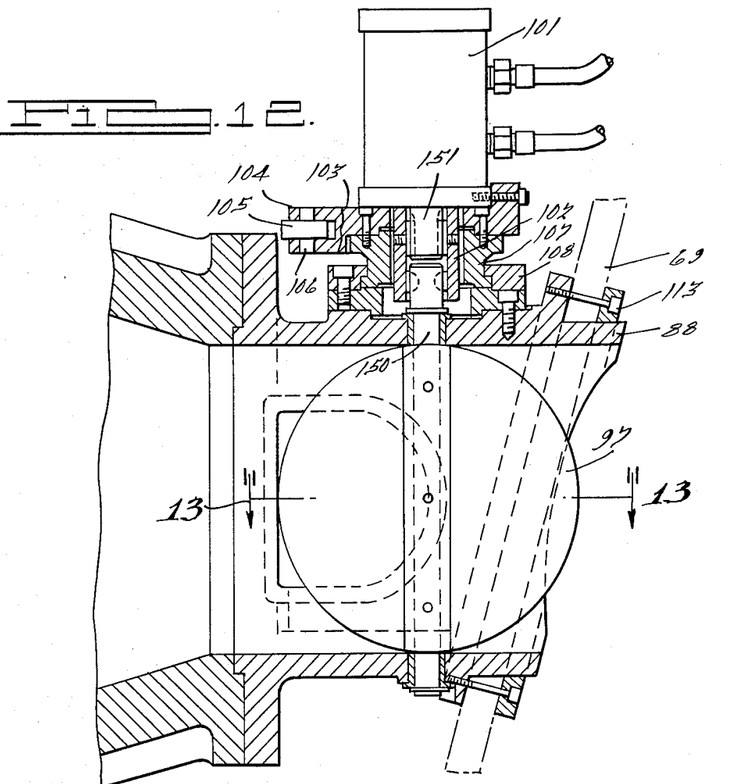
FIG. 12 is an enlarged sectional view of the structure illustrated in FIG. 11, taken on the line 12—12 thereof.
Figure 13:
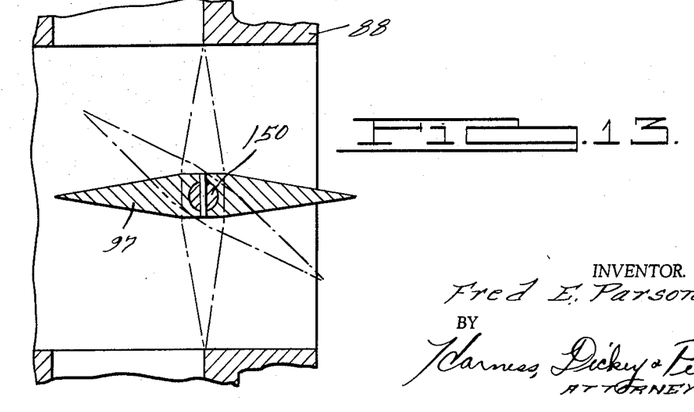
FIG. 13 is a sectional view of the structure illustrated in FIG. 12, taken on the line 13—13 thereof.
Figure 14:
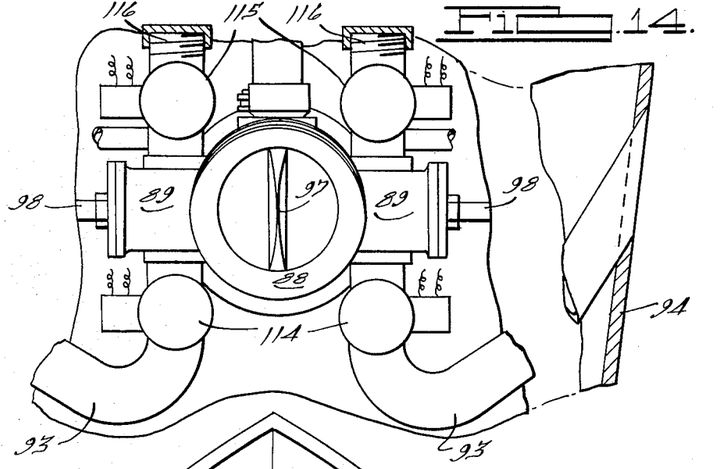
FIG. 14 is an end view of the structure illustrated in FIG. 10 when mounted on the rear of a boat.

In FIGS. 10 to 14, a further form of steering mechanism is illustrated attached to the rear end of the housing section 22. A casting 87 is secured to the flange of the housing section 22 or is cast as one piece integral therewith having a discharge cylinder 88 and a pair of aligned communicating cylinders 89 disposed at right angles thereto. A downwardly directed opening 91 is provided in each of the two aligned cylinders 89 and an upwardly directed opening 92 is provided therein aligned with one of the openings 91. The downwardly extending openings 91 have elbow conduits 93 connected thereto which have an outlet directed forwardly at the bottom of the boat or through the side 94 thereof, as illustrated in FIG. 14. The opening 92 has a plug 90 therein which may be removed to have a fixture attached thereto to which a fire hose or other conduit may be secured when a substantial flow of water is desired. Diametrically disposed apertures 95 are provided through the discharge cylinder 88 enclosed by arched D-shaped plates 96 which are connected to rods 100 of pistons in cylinders 98 supported on the end plates 99 of the aligned cylinders 89. The rods are of a length to move the plate 96 past the conduits 93 so that the flow of water in the aligned cylinders 89 may be directed into the elbow conduits 93 to discharge the water forwardly at the bottom, sides, or otherwise of the boat to thereby reverse the boat movement. By cutting off the supply of water to one or the other of the elbow conduits 93, the boat may be steered in reverse.

The discharge conduit 88 has a steering disk 97 therewithin pivoted on a shaft 150 extending therethrough. The forward and rearward edges of the disk are thin and formed to divide the water passing thereover so as to interfere as little as possible with the flow thereof through the discharge conduit. The shaft 150 is keyed to a shaft 151 of a fluid motor 101 through a connecting sleeve 102. The motor turns the disk 97 within the discharge conduit 88 and thereby directs the discharged water to the right or left in an amount to steer the boat through the water. The motor rests upon a plate 103 which has an extending arm 104 connected with the end of a rod 105 secured thereto by a pin 106. The plate 103 is secured to a rotatable bushing 107 which is secured to the housing by a flanged ring 108. When the arm 104 is moved through 90°, the motor 101 is revolved through 90° along with the shafts 150 and 151 to thereby turn the disk 90° to direct the water into the aligned cylinders 89 and into the elbow conduits 93 to cause the boat to reverse. When in this position, water may be also conducted through the opening 92 when a large flow of water is desired during the time the boat is being reversed. The rod 105 is connected to a piston in a cylinder 109 which has its end secured by a pivot 111 to a base member 112 secured to one of the aligned cylinders 89. In this arrangement it will be noted that the discharge conduit 88 extends through an aperture in the transom 69 and is clamped thereon by a ring 113. With this arrangement, substantially none of the steering and reverse mechanism is disposed outside of the transom.

In FIG. 14 a further arrangement is illustrated, that providing an outlet conduit 116 on each discharge conduit 89 which may be used when a large flow of water is desired. A pair of valves 114 is disposed within the elbow conduits 93 and a pair of valves 115 is disposed within the conduits 116. The disk 97 is turned 90° to direct the water into the aligned conduits 89 for reversing the boat when the valves 114 are open. By closing one of the valves, the boat may be steered during its reverse movement. When the valves 114 are both closed, the valves 115 may be opened to direct the flow of water from the conduits 116. The valves 114, 115 are preferably of the solenoid type so that they may be remotely controlled.

Figure 15:
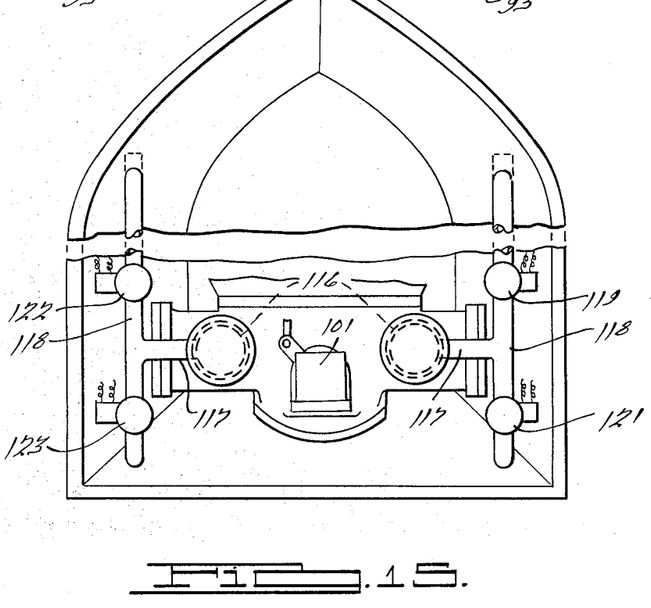
FIG. 15 is a plan view of an amphibious craft with a modified structure mounted thereon which is similar to that illustrative in FIG. 14.
Figures 16, 17, 18, 19:
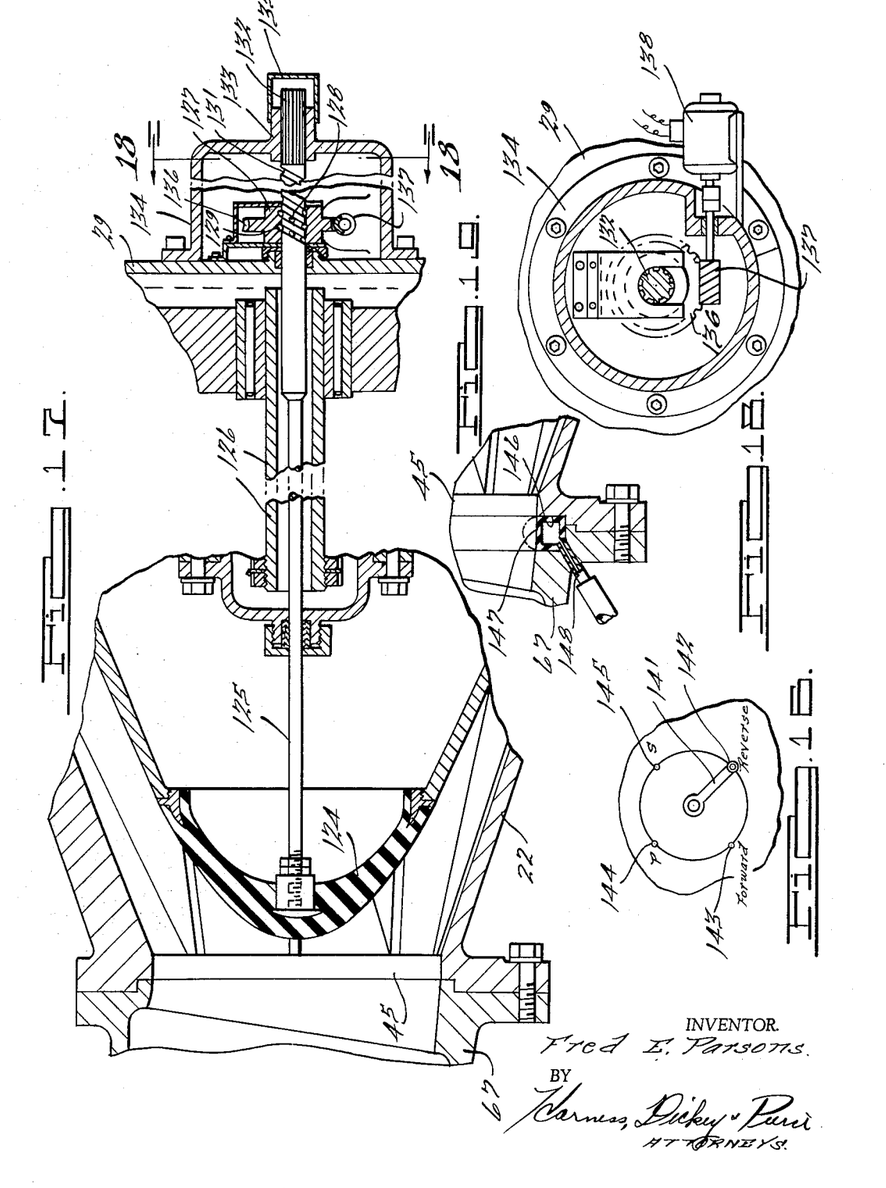
FIG. 16 is a plan view of an operating mechanism for controlling the movement of the boat illustrated in FIG. 15.
FIG. 17 is a broken view of structure, similar to that illustrated in FIG. 3, showing a modified form thereof.
FIG. 18 is a sectional view of the structure illustrated in FIG. 17, taken on the line 18—18 thereof.
FIG. 19 is a view of structure, similar to that illustrated in FIG. 17, showing a further form which the invention may assume.

A still further form of the invention is illustrated in FIGS. 15 and 16 wherein the reversing elbows 93 are eliminated and conduits 117 are connected to conduits 116 which are disposed at right angles to conduits 118 which extend along the sides of the boat and project through the walls thereof at the forward and rearward ends. Solenoid operated valves 119, 121, 122 and 123 are disposed in the conduits 118 on opposite sides of the conduits 117. When the water is delivered to the conduits 116, the boat may be controlled through the passage of the water from the conduits 118 from the forward, rear or diagonally disposed forward and rear ends. In other words, if the boat is to be moved in a rearward direction, the valves 119, 122 are opened. If it is desired to move the boat forwardly, the valves 121, 123 are opened. If the boat is to be turned to the right, the valves 119, 123 are opened. If it is desired to move the boat to the left, the valves 121 and 122 are opened. In this manner the boat may be controlled when the water supply is made available from the conduits 116. In the normal operation of the boat, the motor 101 is employed for steering the boat, but when the water is delivered to the conduits 116, the conduits 118 are employed to steer and move the boat.

In FIG. 16, a control panel is illustrated having a control handle 141 which, when moved to position 142, causes the valves 119, 122 to open to have water ejected forwardly from the conduit 118 to thereby reverse the boat. When the handle 141 is moved to the position 143, the valves 121 and 123 are opened to have the water ejected rearwardly to thereby move the boat forwardly. When the control handle 141 is moved to position 144, the valves 122 and 121 are opened and the boat will move to the left. When the handle 141 is moved to the position 145, the valves 119 and 123 are opened, thereby moving the boat to the right.

Referring to FIGS. 17 and 18, a still further form of the invention is illustrated, that wherein a resilient cap 124 is employed in place of the fixed cap 43 on the propelling device illustrated in FIG. 3. The cap 124 is mounted on a rod 125 which extends through a hollow drive shaft 126 which is driven in the normal manner through the gears within the reduction gear housing 29. The rod 125 is moved longitudinally by a nut 127 containing balls 128 which operate in spiral grooves 129 and 131 in the nut and shaft, respectively. The shaft has a splined end 132 which engages with a splined bushing 133 of a closure cap 134 which is secured to the reduction housing 29. A removable cap 135 is secured to the bushing 133 for enclosing the splined end 132 of the rod 125. The nut 127 has a worm wheel 136 thereon engaged by a worm 137 driven by a motor 138. The motor may be driven in either direction for driving the nut 127 in either direction to thereby move the rod 125 forwardly or rearwardly. When moved in a foward direction, the resilient cap 124 is moved toward the discharge orifice 45 of the housing section 22 to restrict the flow of water and thereby increase its velocity and the speed of the boat. When the boat is loaded, the cap 124 is moved to retracted position, as illustrated in FIG. 16, to provide a greater driving force for the boat. When the boat is unloaded and a greater speed is desired, the cap is moved outwardly toward the aperture 45 to restrict the flow of water and thereby increase its velocity and the speed of operation of the boat. It is to be understood that the cap 124 may be closed at the rear end so that a fluid could be forced therein through a conduit extending therefrom for expanding the cap.

Referring to FIG. 19, a still further form of the invention is illustrated, that wherein the outlet opening 45 of the housing section 22 has an annular slot 146 therein in which an annular tube 147 of neoprene or other resilient material is supported, having a conduit 148 connected thereto by which a fluid may be directed into or out of the tube 147 to expand the tube to extend outwardly of the recess into the discharge passageway to choke off the opening 45, thereby restricting the passageway and increasing the velocity of flow of the discharged water to thereby produce a faster speed to the boat. The tube 147 may be employed alone or in conjunction with the resilient cap 124 so that an accurate control of the speed of movement of the water being discharged from the housing section 22 may be accurately controlled. In this manner, the control of the area of the discharge passageway may be through the use of the resilient cap 124 or the resilient tube 147, or both, depending upon the type of control which is desired.

It is to be understood that when the device embodying the housing sections 21 and 22 is to be employed as a pump, the housing 26 will have a flange thereon in place of the plate 27 to which the flange of an intake conduit for the liquid to be pumped is connected. The flange at the outlet orifice 45 is directly connected to the flange of a conduit into which the liquid is to be pumped. With this arrangement, the propelling device fits within the conduit through which the liquid is to be propelled.

What is claimed is:

1. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, and a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid.

2. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, and a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, the volume flow of the liquid through the passageways over the rotor and stator being substantially equal with the velocity of flow over the latter being greater.

3. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having out-outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, and a shaft rotatably supported within the stator hub in driving relation with said rotor, the cross-section area of the passageway about the rotor being increasingly reduced therealong to increase the velocity of the liquid passing therethrough to a contracted anuular passageway over the stator to provide a constant volume flow of the liquid, the velocity of the liquid flowing through the passageway about the rotor being less than the velocity of the liquid flowing through the passageway about the stator.

4. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to contracted annular passageway over the stator to provide a constant volume flow of the liquid, and a shroud extending over the rotor in engagement with the vanes thereof to form a confined rotatable passageway changing from a cone to a substantially cylindrical form at the large end.

5. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, a shroud extending over the rotor in engagement with the vanes to form a confined rotatable passageway, projecting means on the large end of the stator extending into the rear housing section, a ring engageable with said projecting means, adjacent flanges on said forward and rearward housing sections disposed on opposite sides of said ring, and means for securing said flanges and ring in unit relation to each other.

6. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-section area of the passageway about the rotor being increasingly reduced therealong to increase the velocity of the liquid passing therethrough to a contracted annular passageway over the stator to provide a constant volume flow of the liquid, an outwardly and downwardly extending intake housing secured to the intake end of the forward housing section, a gear reduction mechanism on said housing to which said rotor shaft is connected, a motor having its shaft connected to said mechanism below the rotor shaft to lower the motor relative to the device, means for mounting said device in an amphibious vehicle, and an intake grid on the end of said intake housing which is sealed to an opening through the vehicle.

7. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, a shroud extending over the rotor in engagement with the vanes thereof to form a confined rotatable passageway, means for mounting said device in an amphibious vehicle with the outlet end sealed to a wall thereof, a disk within said orifice, and means for turning said disk at a small angle to steer the vehicle.

8. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, a shroud extending over the rotor in engagement with the vanes thereof to form a confined rotatable passageway, means for mounting said device in an amphibious vehicle with the outlet end sealed to a wall thereof, a disk within said orifice, means for turning said disk at a small angle to steer the vehicle and at an angle of 90° to cut off the flow of water from the outlet end, and at least one elbow in communication with said outlet end for directing the discharged water forwardly of the vehicle to produce its rearward movement thereto when the disk is turned to its 90° position.

9. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, a shroud extending over the rotor in engagement with the vanes thereof to form a confined rotatable passageway, means for mounting said device in an amphibious vehicle with the outlet end sealed to a wall thereof, a disk within said orifice, means for turning said disk at a small angle to steer the vehicle and at an angle of 90° to cut off the flow of water from the outlet end, at least one elbow in communication with said outlet end for directing the discharged water forwardly of the vehicle to produce its rearward movement thereto when the disk it turned to its 90° position, and an outlet conduit on said outlet end from which water under pressure may be conducted.

10. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, an outwardly and downwardly extending intake housing secured to the intake end of the forward housing section, a gear reduction mechanism on said housing to which said rotor shaft is connected and driven at reduced speed from a driving means, means for mounting said device in an amphibious vehicle, an intake grid on the end of said intake housing which is sealed to an opening of the vehicle, an outlet cylinder in extension of the outlet end sealed to a wall of the vehicle, a steering disk within said outlet cylinder which may be disposed across said outlet cylinder to interrupt the discharge of water therefrom, a pair of aligned cylinders on said outlet cylinder, elbow elements secured to said aligned cylinders and communicating through the boat forwardly of the cylinders, and valve means within said aligned cylinders which seal the openings through said discharge cylinder in one position and which are movable beyond the intake to the elbow elements when in another position.

11. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, an outwardly and downwardly extending intake housing secured to the intake end of the forward housing section, a gear reduction mechanism on said housing to which said rotor shaft is connected and driven at reduced speed from a driving means, means for mounting said device in an amphibious vehicle, an intake grid on the end of said intake housing which is sealed to an opening of the vehicle, an outlet cylinder in extension of the outlet end sealed to a wall of the vehicle, a steering disk within said outlet cylinder which may be disposed across said outlet cylinder to interrupt the discharge of water therefrom, a pair of aligned cylinders on said outlet cylinder, outlet conduits from each of said aligned cylinders, and means discharged at the front and rear of the vehicle at both sides thereof connected to said outlet conduits for moving the vehicle.

12. In a liquid propelling device, a forward housing section having a rotor cavity containing a small inlet and a large outlet end, a rearward housing section having a large inlet and a small outlet end, means securing the large ends of said sections together, a substantially truncated conical stator in said rear housing section having outwardly extending longitudinally curved vanes and a central hub, said conical stator curving inwardly at the large end to be substantially parallel to the stator axis, a substantially truncated conical rotor within said rotor cavity having radial vanes extending outwardly thereon, said conical rotor curving inwardly at the large end to be substantially parallel to the rotor axis, said large ends being aligned and forming with the housing sections a passageway portion over the junction of said stator and rotor which is coaxial with the axis thereof, a shaft rotatably supported within the stator hub in driving relation with said rotor, the cross-sectional area of the passageway about the rotor being increasingly reduced therealong to increase the velocity of the liquid passing therethrough to a contracted annular passageway over the stator to provide a constant volume flow of the liquid, an outwardly and downwardly extending intake housing secured to the intake end of the forward housing section, a gear reduction mechanism on said housing to which said rotor shaft is connected and driven at reduced speed from a driving means, means for mounting said device in an amphibious vehicle, an intake grid on the end of said intake housing which is sealed to an opening of the vehicle, an outlet cylinder in extension of the outlet end sealed to a wall of the vehicle, a steering disk within said outlet cylinder which may be disposed across said outlet cylinder to interrupt the discharge of water therefrom, a pair of aligned cylinders on said outlet cylinder, outlet conduits from each of said aligned cylinders, means discharged at the front and rear of the vehicle at both sides thereof connected to said outlet conduits for moving the vehicle, and valve means in said conduit at each side of the vehicle forwardly and rearwardly of the outlet conduits by which the water may be discharged at both sides of the vehicle from the front end, the rear end or at opposite ends of the vehicle for controlling its position.

13. In a liquid propelling device, a forward housing section having an inlet opening, a rearward housing section having an outlet opening, a stator in said rearward section, a rotor in said forward section, the passageway in said forward section between said rotor and housing section being of converging substantially truncated conical section of decreasing cross-sectional area blending into a substantially coaxial passageway at the large end, the passageway in said rearward housing section between said stator and housing section being of a diverging substantially truncated conical section of substantially uniform cross-sectional area blending into a coaxial passageway at the large end in continuation of the passageway at the large end of the rotor to provide a solid stand of moving liquid at increasing velocity through the front section and constant volume flow through the device when the rotor is driven, and a shaft for driving said rotor.

14. In a liquid propelling device, a forward housing section having an inlet opening, a rearward housing section having an outlet opening, a stator in said rearward section, a rotor in said forward section, the passageway in said forward section between said rotor and housing section being of converging substantially truncated conical section of decreasing cross-sectional area blending into a substantially coaxial passageway at the large end, the passageway in said rearward housing section between said stator and housing section being of a diverging substantially truncated conical section of substantially uniform cross-sectional area blending into a coaxial passageway at the large end in continuation of the passageway at the large end of the rotor to provide a solid stand of moving liquid at increasing velocity through the front section and constant volume flow through the device when the rotor is driven, and a shaft for driving said rotor, the area of the cylindrical passageway and that about said stator being further restricted to further increase the velocity of the moving liquid.

15. In a liquid propelling device, a forward housing section having an inlet opening, a rearward housing section having an outlet opening, a stator in said rearward section, a rotor in said forward section, the passageway in said forward section between said rotor and housing section being of converging substantially truncated conical section of decreasing cross-sectional area blending into a substantially coaxial passageway at the large end, the passageway in said rearward housing section between said stator and housing section being of a diverging substantially truncated conical section of substantially uniform cross-sectional area blending into a coaxial passageway at the large end in continuation of the passageway at the large end of the rotor to provide a solid stand of moving liquid at increasing velocity through the front section and constant volume flow through the device when the rotor is driven, a shaft for driving said rotor, a resilient cap on the outlet end of the stator, and means for expanding said cap into the area of the outlet opening for choking the flow of water thereat.

16. In a liquid propelling device, a forward housing section having an inlet opening, a rearward housing section having an outlet opening, a stator in said rearward section, a rotor in said forward section, the passageway in said forward section between said rotor and housing section being of converging substantially truncated conical section of decreasing cross-sectional area blending into a substantially coaxial passageway at the large end, the passageway in said rearward housing section between said stator and housing section being of a diverging substantially truncated conical section of substantially uniform cross-sectional area blending into a coaxial passageway at the large end in continuation of the passageway at the large end of the rotor to provide a solid stand of moving liquid at increasing velocity through the front section and constant volume flow through the device when the rotor is driven, a shaft for driving said rotor, the outlet opening of the rearward housing section having an annular recess therein, an annular tube in said recess, and means for expanding said tube into the area of the outlet opening for choking the flow of discharged water thereat.

References Cited by the Examiner

UNITED STATES PATENTS

| 1,498,919 | 6/1924 | Jensen | 60—35.5 |
| 2,514,393 | 7/1950 | Hutchinson | 60—35.6 |
| 2,641,104 | 6/1953 | Estabrook | 60—35.6 |

(Other references on following page)

UNITED STATES PATENTS

| | | | |
|---|---|---|---|
| 2,647,467 | 8/1953 | Davis | 103—89 |
| 2,915,034 | 12/1959 | Russell | 115—34 |
| 2,965,065 | 12/1960 | Tinker | 103—89 X |
| 2,998,198 | 8/1961 | Young | 60—35.5 X |
| 3,030,909 | 4/1962 | Barnes et al. | 60—35.54 X |
| 3,083,530 | 4/1963 | Spence | 60—35.5 |
| 3,090,346 | 5/1963 | Burgin | 60—35.55 X |
| 3,093,965 | 6/1963 | Cochran et al. | 60—35.54 |

MARK M. NEWMAN, *Primary Examiner.*

ABRAM BLUM, *Examiner.*

W. A. SCHUETZ, R. D. BLAKESLEE,
*Assistant Examiners.*